Jan. 29, 1924.
G. A. TAYLOR
1,482,101
PISTON
Filed Sept. 28, 1922
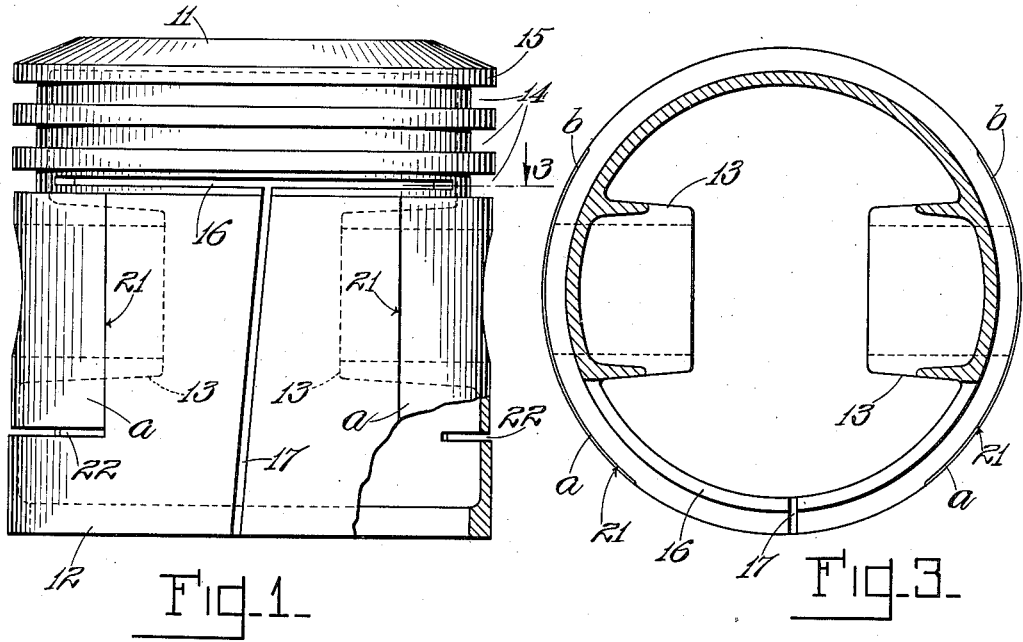
Fig. 1.
Fig. 3.
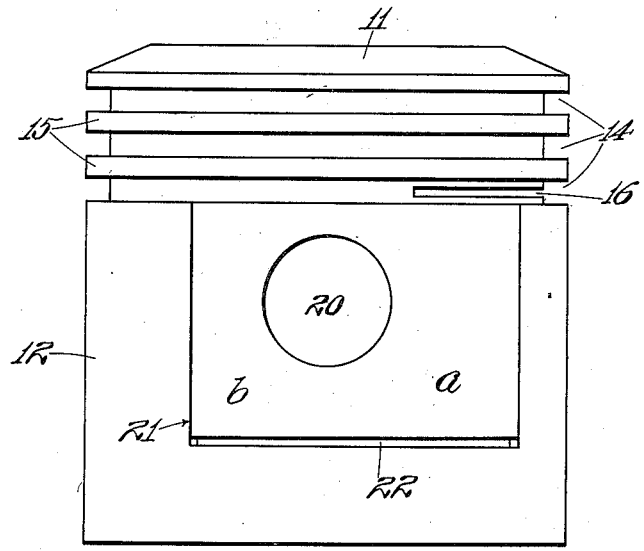
Fig. 2.
INVENTOR:
George A. Taylor.
By Macleod, Calver, Copeland & Dike
Att'ys Patented Jan. 29, 1924.

1,482,101

UNITED STATES PATENT OFFICE.

GEORGE A. TAYLOR, OF BOSTON, MASSACHUSETTS.

PISTON.

Application filed September 28, 1922. Serial No. 591,073.

*To all whom it may concern:*

Be it known that I, GEORGE A. TAYLOR, a citizen of the United States, residing at Boston, county of Suffolk, State of Massachusetts, have invented a certain new and useful Improvement in Pistons, of which the following is a specification, reference being had therein to the accompanying drawings.

My present invention relates to pistons for internal combustion engines, and particularly to those made from cast iron or aluminum alloys.

The particular object of the present invention is to produce a piston which, when provided with suitable piston rings, will be somewhat resilient and compressible circumferentially throughout its entire length, so that the piston can be employed in a cylinder having the same or even a less diameter than that of the piston before it is inserted in the cylinder. The skirt of the piston embodying my invention is in effect a single piston ring which, on being inserted in the cylinder, assumes substantially the shape of the cylinder bore, and, as it wears, tends to improve the perfection of the fit.

The piston embodying my invention is so constructed as to be more resilient on one side than on the other and therefore makes provision for the unequal lateral forces which exist in an internal combustion engine.

I have found by actual practice that a piston embodying my invention, and having a diameter slightly greater than that of the bore of the cylinder with which it is to be used, can be inserted in the cylinder and with ordinary lubrication be operated successfully, and that the fit improves as the parts wear, particularly if the piston is employed in a cylinder which is already somewhat worn and therefore out of round.

The piston embodying my invention is adapted for use not only with new engines, in which case the piston and cylinder assume complementary forms as they wear and therefore the tightness of the engine is preserved, but for old engines in which the cylinders have already been subjected to irregular wear.

The piston embodying my invention can be constructed either of cast iron or of the aluminum alloys now familiar to those skilled in this art, and the expense is not increased substantially.

The invention will be fully understood from the following description when taken in connection with the accompanying drawings, and the novel features thereof will be pointed out and clearly defined in the claims at the close of this specification.

In the drawings, Fig. 1 is a side elevation of a piston embodying my invention.

Fig. 2 is an elevation as viewed from the left of Fig. 1.

Fig. 3 is a section on line 3 of Fig. 1.

Referring now to the drawings, at 11 is shown a head, at 12 a skirt and at 13, 13 the piston pin bearings. The head is provided with piston ring grooves 14, 14, 14 separated from each other by lands 15, 15 in the usual manner, and the diameter of the piston taken through the skirt is slightly greater than the diameter taken through the lands 15, so that when the piston rings (not shown) are in place in the grooves and the whole in the working position in the cylinder, there will be contact between the piston rings and the cylinder walls, and between the peripheral surface of the skirt and the cylinder walls, but the lands will not contact with the walls. Since, as will be explained hereafter, the skirt is resilient and compressible, all those parts of the structure which contact with the cylinder walls are yielding and the resiliency of the several yielding parts varies according to the pressures to which they are to be subjected.

The head and skirt are separated from each other on one side of the piston pin bearings by a horizontal slot 16 preferably located at the bottom of the lower piston ring groove 14. This side of the skirt is also traversed by a substantially vertical slot 17, which, in actual practice, preferably extends from the bottom edge of the skirt to the horizontal slot 16. The opposite side of the piston is integral with the head and provides a maximum section of metal for the transfer of heat from the head through the skirt to the cylinder walls through which the heat passes to the cooling medium, whether air or water. The piston embodying my invention is placed in the cylinder of the engine so that the reaction due to the compression will come against the relatively resilient side of the piston while the reaction due to the explosion, which reaction is much greater than that due to the compression, will come against the non-resilient side. It will, therefore, be seen that the piston will have sufficient strength to withstand the shocks to which it is subjected, while at the same time is sufficiently resilient throughout its entire height or length to accommodate itself to the minute variations from a true cylinder which are always found in the cylinders of an engine.

Surrounding each piston pin hole 20 is a relieved area 21, that is, the piston is constructed so that this portion of its surface is formed on a slightly smaller diameter and will not contact with the cylinder wall. This relieving is conveniently accomplished by machining or grinding. At the bottom of each relieved area is a slot 22. In practice, I make these relieved areas extend from this slot 22 to the lower piston ring groove 14. I also form a larger relieved area on the compression side of the piston pin bearing, as shown at $a$ in Figure 2, than on the explosion side, as shown at $b$. By this construction there is a larger surface on the explosion side of the piston in contact with the cylinder wall than the corresponding surface on the compression side of the piston, thereby reducing the friction without reducing the effectiveness of the piston as a barrier to the passage of gases from the explosion chamber to the under side of the piston. It will also be seen that the unrelieved area below the relieved area is in contact with the cylinder wall and furnishes an additional barrier to the passage of gases and also affords additional area of contact with the wall. Furthermore, the additional relieved area on the compression side of the piston increases the flexibility of that side of the piston and removes all danger of binding over the areas where the piston, if unrelieved, would bind. The slots 22 reduce the tendency of the piston pin bearings to get out of line with each other, since the portion of the piston containing the slots and the explosion side of the piston are practically inflexible but accommodate themselves to the shape of the cylinder by sidewise movement of the piston as a whole permitted by the flexibility of the compression side of the piston.

From the foregoing it will be seen that the explosion side of the piston is practically rigid and contacts with the cylinder wall throughout a greater part of its peripheral surface, while the compression side of the piston is relatively flexible and resilient and contacts with the cylinder wall through a much smaller portion of its area but thereby forming sufficient support and reducing the friction.

Since an important function of the piston of an internal combustion engine is the transference of the heat produced by the explosion to the cooling jacket, it is essential that an ample pathway for the heat be provided from the head to the cylinder walls. In the piston, already described, the head and the skirt are integral through an angle of considerably more than 180 degrees and therefore a large amount of the heat can pass through the piston and the skirt thereof to the lower portions of the cylindar walls which are cooled by the cooling system. In this respect, the device embodying the invention is superior to present practice, because in pistons where the skirt and the head are almost entirely separated from each other by slots, transference of heat through the skirt to the cylinder walls is impeded and the temperatures to which the piston head and rings are subjected are increased, thereby increasing carbon deposits and pre-ignition, particularly with high compression engines. Furthermore, the lower temperature of the piston head reduces the tendency of the oil to burn onto the inside of the piston, which lowers the viscosity of the oil and interferes with the transfer of heat to the oil itself.

What I claim is:

1. A piston for internal combustion engines having a head, a skirt, and piston pin bearings, the head on one side of the bearings being integral with the skirt and affording a maximum section for heat transference between the head and the cylinder walls and on the other side of the piston pin bearings, the skirt being separated from the head by a slot located in a ring groove and divided by a vertical slot intercepting said ring groove slot, thereby rendering the slotted side of the piston resilient, there being a relieved peripheral area about the ends of the piston pin bearings, which area is greater on the resilient side of the piston than on the non-resilient side.

2. A piston for internal combustion engines having a head, a skirt and piston pin bearings, the skirt and head being integral on one side of the bearings and separated from each other on the other side by a slot, the surface of the piston being relieved about the bearings for a less amount on the integral side than on the slotted side.

3. A piston for internal combustion engines having a head, a skirt and piston pin bearings, the skirt and head being integral on one side of the bearings and separated from each other on the other side by a slot located in a piston ring groove, the surface of the piston being relieved about the bearings for a less amount on the integral side than on the slotted side.

4. A piston for internal combustion engines having a head, a skirt and piston pin bearings, the skirt and head being integral on one side of the bearings and separated from each other on the other side by a slot, the surface of the piston being relieved about the bearings for a less amount on the integral side than on the slotted side, and there being a slot along the lower margin of the relieved portion.

5. A piston for internal combustion engines having a head, a skirt and piston pin bearings, the skirt and head being integral on one side of the bearings and separated from each other on the other side by a slot located in a piston ring groove, the surface of the piston being relieved about the bearings for a less amount on the integral side than on the slotted side, and there being a slot along the lower margin of the relieved portion.

In testimony whereof I affix my signature.

GEORGE A. TAYLOR.